(No Model.)
T. BROWN.
Separator for Ores.
No. 236,544. Patented Jan. 11, 1881.
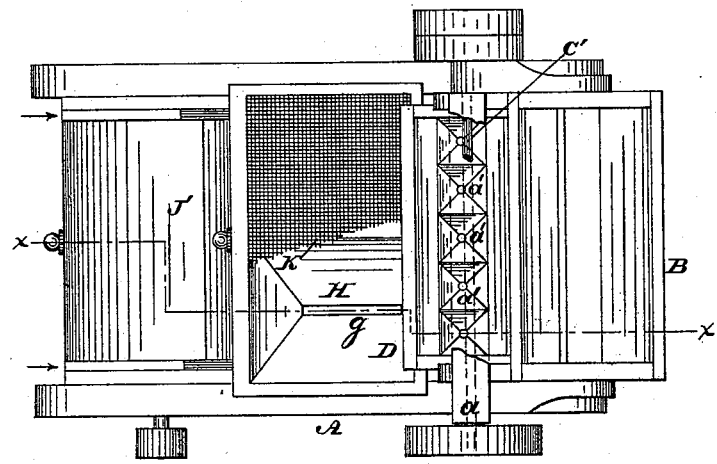
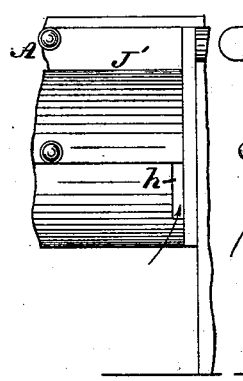
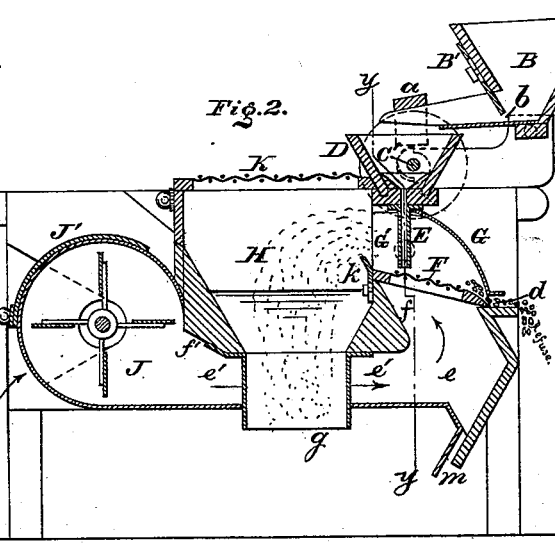
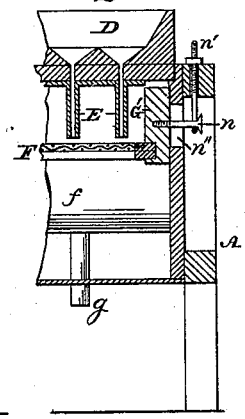
Witnesses:
A. P. Grant
W. F. Kircher
Inventor:
Thomas Brown,
by John A. Diedersheim
ATTORNEY.

UNITED STATES PATENT OFFICE.

THOMAS BROWN, OF PHILADELPHIA, PENNSYLVANIA.

SEPARATOR FOR ORES.

SPECIFICATION forming part of Letters Patent No. 236,544, dated January 11, 1881.

Application filed July 2, 1880. (No model.)

*To all whom it may concern:*

Be it known that I, THOMAS BROWN, a citizen of the United States, residing in the city and county of Philadelphia, and State of Pennsylvania, have invented a new and useful Improvement in Separators for Ores, &c., which improvement is fully set forth in the following specification and accompanying drawings, in which—

Figure 1 is a top view, partly broken away, of the separator embodying my invention. Fig. 2 is a vertical section thereof in line $x\ x$, Fig. 1. Fig. 3 is an end view of a portion thereof. Fig. 4 is a side elevation of a portion thereof. Fig. 5 is a detail view, in cross-section, through the sieve-support.

Similar letters of reference indicate corresponding parts in the several figures.

My invention consists of certain improvements in separators for ores and other materials, whereby the material is first properly distributed, and then has its finer and heavier particles separated. Provision is made for adjusting the feed of the material, regulating the blast, adjusting the sieve, and collecting the finest particles of material passed through said sieve, all as will be hereinafter set forth.

Referring to the drawings, A represents a frame properly supported on legs or feet, and supporting the working parts of the separator.

B represents a vibrating hopper mounted on the top of one end of the frame A, and carrying at its side a lug, $a$, which rests upon a cam-wheel, C, whose shaft $C'$ is mounted on the frame A below the hopper B, and passes through another hopper, D, supported on the frame below the hopper B. The bottom or bottom plate of the hopper B projects from the side of the latter opposite to its axis, so as to overhang the hopper D, and cause the ore or other material placed in said hopper B to be directed to the hopper D. The throat or outlet $b$ of the hopper B is adapted to be covered and uncovered by a vertically-adjustable slide or plate, $B'$, connected to the outer side of the hopper, whereby the discharge of the material in the hopper B may be regulated or adjusted.

From the bottom of the hopper D depend a series of tubes, E, each of which communicates with an opening, $a'$, in the bottom of the hopper D, so that the material entering said hopper D will fall through the tubes E as distributers.

Secured to the sides of the frame A, at one end thereof, is a horizontally-arranged reticulated plate, netting, or sieve, F, above which is a guard or deflector, G, which is secured to the frame A, and extends from the base of the hopper D to near the outer end of the sieve F, leaving at the latter place a throat or outlet, $d$, for the discharge of dirt, grit, stones, and heavy matters generally of the ore, &c.

H represents the receiving-chamber for the fine or valuable particles of the ore, &c., the same being supported on the frame A adjacent to the sieve F, and separated on one side from an air-chest, $e$, below the sieve F, by the wall $f$ of said chamber H, and on the other side from the fan or blast-chamber J by the opposite wall, $f'$, of said chamber H, the chamber J communicating with the air-chest $e$ by a passage, $e'$, beneath the chamber H, the discharge-spouts $g$ of which project through the passage $e'$ and appear below the bottom wall of said passage. A portion of the fan-case is cut away, as at $h$, for the admission of air, and another portion, $J'$, thereof is made movable in a circular direction, so as to be permitted to cover and uncover the air-inlets $h$, and thus adjust the admission of air into the case, the portion $J'$ being fitted in circular guides or grooves in the sides of the frame A.

Secured to the wall $f$, at the inner end of the sieve F, is a vertical adjustable deflector, $k$, and from the bottom of the walls of the air-chest $e$ depends a spout, $m$, which communicates with said chest $e$.

The receiving-chamber H is covered by a reticulated plate, K, and the sieve F is made vertically adjustable by means of screws $n$ and eyebolts $n'$, all as will be hereinafter set forth.

The operation is as follows: Power is applied to the shaft $C'$ and shaft of the fan J in any suitable manner. The rotation of the cam C on the shaft $C'$ causes the rising and falling of the hopper B, the falling motions being somewhat abrupt, so as to shake or agitate the ore or material in the said hopper. The fan J forces air through the passage $e'$ into the chest $e$, and then through the meshes of the sieve F into the chamber H, from whence it escapes through the top reticulated plate, K, the meshes whereof are sufficiently small to prevent the passage through them of the fine particles of ore or material to be separated. The ore or material, properly crushed or ground, placed in the hopper B, escapes at the throat $b$, and falls into the hopper D, the shaft C′ therein also serving to agitate the material, so that the material runs down through the tubes E and drops on the sieve F, where it is subjected to the blast of air, the effect of which is to blow the light or valuable particles of material into the chamber H. The heavy matters roll on the sieve F and are discharged at the throat $d$, while the light or fine particles passed into the chamber H escape through the spout $g$ to a place of deposit or collection. Should any fine particles fall through the sieve F and enter the wind-chest $e$, they are carried out therefrom through the discharge-spout $m$.

By vertically adjusting the deflector $k$ between the chamber H and sieve F the blast of air entering said chamber may be directed into said chamber at more or less acute angles, and thus blow the particles of ore or material to a greater or less height relatively to the specific gravity of the same for thoroughly preventing the heavier matters entering the chamber H and insuring the separation of the material.

The sieve F may be set nearer to or farther from the bottom of the tubes E, and have its pitch adjusted by means of the screws or pins $n$, which pass through vertical slots $n''$, in the sides of the frame A, and are secured to side pieces of the sieve at the forward end thereof. To the heads of said screws or pins $n$ are attached the upright bolts or screws $n'$, which are passed through the sides of the frame A. By raising and lowering the bolts or screws $n$ the sieve is correspondingly adjusted, and when so adjusted the parts are held by means of nuts fitted to the upper ends of the bolts or screws, and resting on the top pieces of the frame A, or other suitable portion thereof.

The tubes E serve to distribute the material, whereby the air-blast has greater access to it and packing of the said material on the sieve F is prevented.

Having thus described my invention, what I claim as new, and desire to secure by Letters Patent, is—

1. The oscillating hopper B, in combination with the hopper D, having the shaft C′ passed through it, substantially as and for the purpose set forth.

2. The hopper with the depending tubes E, in combination with sieve F, adjusting pins or screws $n$, and bolt or screws $n'$, substantially as and for the purpose set forth.

3. The sieve F, in combination with overhanging deflector G and the bottom air-chest, $e$, said deflector and sieve forming the throat $d$ between them, substantially as and for the purpose set forth.

4. The receiving-chamber H, in combination with the sieve F, the air-chest $e$, and deflector G, and fan J, substantially as and for the purpose set forth.

5. The sieve F and deflector G, forming the throat $d$, in combination with the receiving-chamber H and the air-chest $e$, having spout $m$, substantially as and for the purpose set forth.

6. The receiving-chamber H and sieve F, in combination with the adjustable deflector $k$, substantially as and for the purpose set forth.

THOMAS BROWN.

Witnesses:
 JOHN A. WIEDERSHEIM,
 A. P. GRANT.